United States Patent [19]

Eswaran et al.

[11] 4,292,623
[45] Sep. 29, 1981

[54] PORT LOGIC FOR A COMMUNICATION BUS SYSTEM

[75] Inventors: Kapali P. Eswaran, San Jose, Calif.; Vincent C. Hamacher, Toronto, Canada; Gerald St. Shedler, Los Gatos, Calif.

[73] Assignee: International Business Machines Corporation, Armonk, N.Y.

[21] Appl. No.: 53,493

[22] Filed: Jun. 29, 1979

[51] Int. Cl.³ .............................................. H04Q 9/00
[52] U.S. Cl. ................................. 340/147 R; 370/94; 178/3
[58] Field of Search ...... 340/147 R, 147 SY, 147 LP; 178/3; 370/94, 91, 85, 61, 60

[56] References Cited

U.S. PATENT DOCUMENTS

| | | | |
|---|---|---|---|
| 3,485,953 | 12/1969 | Norberg | 340/147 R |
| 3,825,897 | 7/1974 | Lawton | 340/147 LP |
| 3,863,220 | 1/1975 | Osawa | 340/147 LP |
| 4,038,644 | 7/1977 | Duke | 364/900 |
| 4,063,220 | 12/1977 | Metcalfe | 340/147 R |
| 4,095,045 | 6/1978 | Johnson et al. | 178/3 |
| 4,096,355 | 6/1978 | Rothauser et al. | 370/94 |
| 4,176,341 | 11/1979 | Miyazaki | 340/147 C |

OTHER PUBLICATIONS

Clark, et al. "An Introduction to Local Area Networks", *Proceedings of the IEEE*, vol. 66, No. 11, Nov. 78, pp. 1497ff.
Farber, et al. "The System Architecture of the Distributed Computer System", *Computer Communications Networks and Teletraffic* (Brooklyn Polytechnic Symposium), Apr. 1972, pp. 21-27, (DCS).
Fraser, "A Virtual Channel Network", *Datamation 21*, Feb. 1975, pp. 51-53, (Bell Labs Spider and Datakit).
Fletcher, "Serial Communication Protocol . . . ", *Computer Design*, Jul. 1978, p. 77ff.
Farber, et al., "The Distributed Computing System", *Compron 73*, pp. 31-34, 1973, (DCS).
Metcalfe, et al., "Ethernet: Distributed Packet Switching . . . ", *Communications of the ACM*, vol. 19, No. 7, Jul. 1976, p. 395ff.
Jensen, "The Honeywell Experimental Distributed Processor . . . ", *Computer*, Jan. 1978, p. 28ff.

*Primary Examiner*—Donald J. Yusko
*Attorney, Agent, or Firm*—Shelley M. Beckstrand; R. Bruce Brodie

[57] ABSTRACT

Apparatus and method for enabling asynchronous, collision-free communication between ports on a local shared bus network which is efficient in the use of bus bandwidth and which, in one embodiment, provides a bounded, guaranteed time to transmission for each port.

12 Claims. 10 Drawing Figures

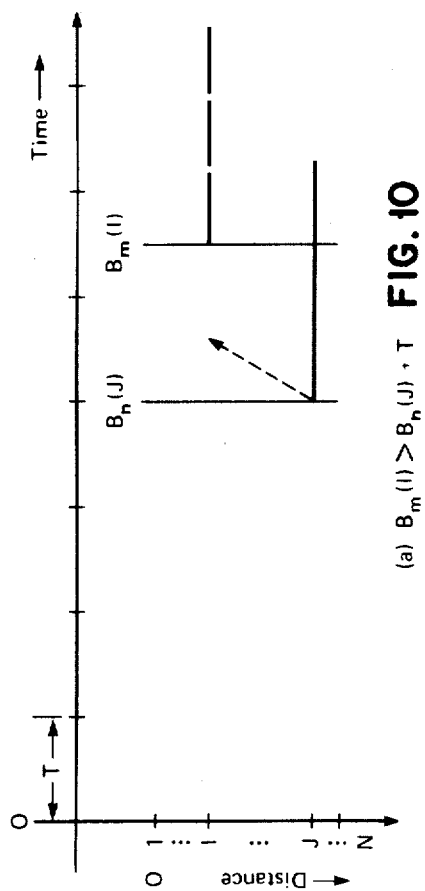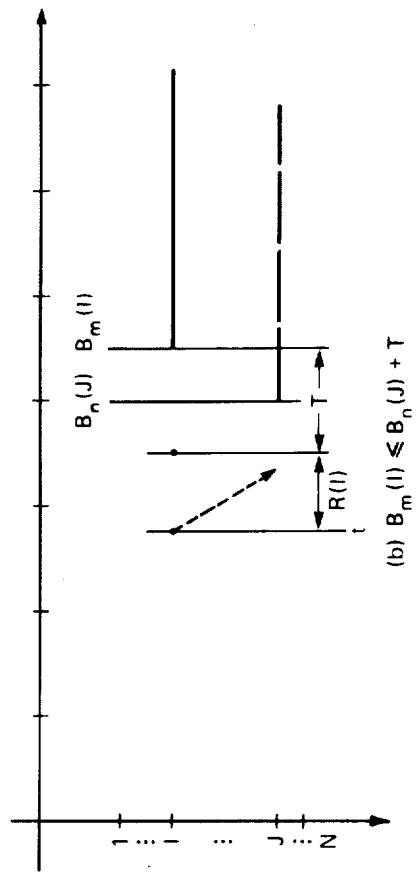

PORT LOGIC FOR A COMMUNICATION BUS SYSTEM

DESCRIPTION

1. Technical Field

The present invention relates to data communication systems, and more particularly to data communication systems which transmit variable length data packets among ports of a local area computer network.

2. Background Art

A local area computer network is a data communication network, typically a packet communication network, limited in geographic scope. Long-haul networks are conventional packet communications networks not limited in geographic scope. Communications among computing devices connected by a local communication network tend to be short and to occur in bursts. Because of these two characteristics, in a local network, the use of packet switching techniques is preferable to circuit switching. With packet switching, a message is broken into one or more packets, and a packet is the unit of transmission.

Local area networks find application in the interconnection of a confederation of minicomputers, operating somewhat independently of each other, yet still having the need to communicate with each other as they work toward the overall mission of the organization.

Local area networks comprise three hardware components: the transmission medium, a mechanism for control, and an interface to the network. A fourth basic element of local area networks is a set of protocols, implemented at the host computer or other devices connected to the networks (the nodes of the networks) which control the transmission of information from one host or device to another via the hardware elements of the network.

Network topology is the pattern of interconnection used among the various nodes of the network. The most general topology is an unconstrained graph structure, with nodes connected together in an arbitrary pattern. This topology requires the unavoidable cost of making a routine decision at each node a message traverses. A message arriving at a node cannot be blindly transmitted out to all the other links connected to that node, for that would result in a message that multiplied at every node and propagated forever in the network. Thus, each node must decide, as it receives a message, on which link it is to be forwarded, which implies a substantial computation at every node.

A variety of constrained topologies with attributes particularly suited to local area networks include the star, the ring, and the bus.

A star network eliminates the need for each network node to make routing decisions by localizing all message routine in one central node. The cost and difficulty of making the central node sufficiently reliable may more than offset any benefit derived from the simplicity of the other nodes.

The ring and bus topologies attempt to eliminate the central node on the network, without sacrificing the simplicity of the other nodes. In the ring topology, a message is passed from node to node along unidirectional links in a continuous loop. There are no routing decisions to be made in this topology; the sending node simply transmits its message to the next node in the ring, and the message passes around the ring, one node at a time, until it reaches the node for which it is intended.

The only routing requirement placed on each node is that it be able to recognize, from the address in the message, those messages intended for it. Similarly, in the bus structure, there are no routing decisions required by any of the nodes. A message flows away from the originating node in both directions to the ends of the bus. The destination node reads the message as it passes by. Again, a node must be able to recognize messages intended for it.

Both the ring network and bus network have the problem of determining which node may transmit at any given time: lacking a central node, a distributed mechanism is required. In ring networks, a variety of control strategies (including daisy chain, control token, message slots, and register insertion) are available. These same control strategies may also be applied to bus networks.

A bus topology also requires a decentralized control strategy or access control technique. One very simple control strategy that has been used for bus networks is contention. In a contention net, any node wishing to transmit simply does so. Since there is no control or priority, nothing prevents two nodes from attempting to transmit simultaneously, in which case a collision occurs, and both messages are garbled and presumably lost. The contention control strategy depends on the ability of a node to detect a collision, at which point it waits a random amount of time (so that the same collision will not recur), and then retransmits its message. The mechanisms that must be implemented at each node are: a timer capable of generating a random distribution, and some means of detecting collisions.

A variety of strategies have been used to detect collisions. One contention packet network technique for detecting a collision is the transmitting node starts a timer when it transmits the message, and if an acknowledgment for the message is not received when the timer expires, the message is retransmitted. The disadvantage of this collision detection scheme is that it leads to a very low theoretical upper limit on the percentage of channel capacity which can be utilized without causing the network to overload with retransmission traffic.

A strategy which increases the maximum effective transmission capacity of the network is to listen before transmitting. A collision will now occur only if two nodes attempt to transmit at nearly the same instant, because if one node has started sufficiently in advance of the other so that its signal has propagated over the transmission medium to that other node, the other node will hear the signal and will refran from transmitting.

A related strategy is to listen, while transmitting as well. This permits colliding nodes to detect the collision more promptly than if they detected the collision only by noticing the absence of an acknowledgment. This strategy not only reduces the delay caused by a collision, it makes the transmission medium available sooner, as well, since colliding nodes can cease transmitting as soon as they detect a collision.

Examples of existing implemented or proposed local networks include those described in the following references: Xerox: Metcalfe, R. M. and Boggs, D. R., "Ethernet: Distributed Packet Switching for Local Computer Networks," *Comm. ACM* 19, 395-404, 1976; Honeywell: Jensen, E. D., "The Honeywell Experimental Distributed Processor—An Overview," *Computer* 11, 28-38, January 1978; DCS: Farber, D. J., et.al., "The Distributed Computing System," *Compcon* 73, 31-34, 1973; and Farber, D. J. and Larson, K. C., "The System Architecture of the Distributed Computer System—The Communications System," in Computer-Communications Networks and Teletraffic, 21-27 (Brooklyn Polytechnic Symposium), April 1972; Bell Labs Spider and Datakit: Fraser, A. G., "A Virtual Channel Network," *Datamation* 21, 51-53, February 1975; NBS and Mitrenet: Cottom, I. W., ed., "Computer Science and Technology: Local Area Networking," NBS Special Publication 500-31, National Bureau of Standards, Washington, D.C., April 1978. The several topologies are discussed and compared in Clark, D. D., Pogran, K. T., and Reed, D. P., "An Introduction to Local Area Networks," *Proc. IEEE* 66, 1497-1517, November 1978.

These networks differ with respect to one or more of the following features: structure or topology, primary use, error control, protocols with respect to collision detection or avoidance, interface construction (hwardware and software), and cost of the interfaces.

The Xerox, Honeywell, and NBS networks are broadcast bus networks, whereas the DCS and Spider networks are ring networks, the Datakit network has a star configuration, and Mitrenet uses two busses. In general, for comparable bandwidths, the bus topology appears to provide realiability/availability at or above the levels attainable with either the ring or star topologies. In addition, the cost of the network and the associated interfaces seems to be lower for bus networks than for ring or star networks. To compare the relative advantages and disadvantages of any two networks, it is necessary to compare the control schemes with respect to the following properties, as well as the general topology.

An asynchronous communication network is one in which there is no concept of a global clock. If there is no central mechanism which manages the activities of the ports related to transmission and reception of messages, then the control scheme for the network is distributed. A network with distributed control is collision-free if at most one port may transmit a message at a time. In a communication network that is not collision-free, the bandwidth of the network is wasted during period of collision.

A control scheme for a communication network may or may not provide a guaranteed time to transmission, that is, ensure that a message which becomes available to a port for transmission will eventually be transmitted. Even if the control scheme ensures transmission of all messages, there may not be a bounded, guaranteed time to transmission; that is, there may be no fixed time interval within which transmission of a message which is available for transmission will begin.

Of necessity there must be some overhead associated with any scheme for distributed control of a communication network, and the efficiency of the control scheme relates to the extent of this overhead. Any meaningful measure of the efficiency of a (collision-free) control scheme involves the intervals of time during which no message is being transmitted but at least one port has a message to transmit.

Finally, there are the notions of the simplicity and fairness of a control scheme. Greater complexity in a control scheme generally is concomitant with higher cost and lower reliability. Fairness relates to whether or not each port has equal access to the network.

The Xerox and Honeywell local communication networks both use a single, bit-serial, broadcast bus to interconnect ports. In the Xerox system, called Ethernet, the line transceivers are capable of detecting a collision; that is, a port that begins transmitting a packet after it observes the line to be quiescent can detect whether or not some other transmission begins to interfere with its transmitted signal. If a collision is detected, the port stops its transmission, and after a random waiting period, attempts retransmission. The parameters of the probability distributions that are used to determine the waiting periods in the individual ports are adjusted if more than one retry is necessary. The stochastic nature of the retry waiting periods and the dynamic changes to the distributions themselves are intended to achieve a reduction of collisions, especially following the end of transmission of a packet. The Ethernet control is thus asynchronous and distributed, but it is not collision-free. Also, it is possible for a port to be blocked indefinitely from transmitting a packet without collision.

The Honeywell system, called HXDP (for Honeywell experimental distributed processor), also uses a broadcast bus. Access control is distributed, collision-free, and provides bounded, guaranteed time to transmission. There is a coded global clock signal that is used to step each port synchronously through the line access control algorithm. This signal is transmitted on the broadcast bus itself by using a special line-signal sequence that cannot be confused with packet data signals. Access control is built around a 256-bit vector stored in each port. The global clock signal steps each of the ports through its respective vector, one step for every termination of a line usage interval. There is exactly one port with a 1 at any vector address; this signifies that the port may use the line during the next usage interval. During this interval, the distinguished port transmits a packet if one is available to it, and then transmits the clock signal. If there is no packet available, the port immediately transmits the clock signal, thus effecting transfer of access control to the next port. The number of 1's in a port's vector determines its fraction of bus usage intervals during a complete sweep through the vector. HXDP implements synchronous, collision-free line access with high line use efficiency, coupled with different rates of access (or fractions of line usage) for individual ports; however, this is accomplished at the expense of the vector hardware required in each port.

SUMMARY OF THE INVENTION

This invention provides an apparatus and method for enabling asynchronous, collision-free communication between ports on a local contention bus network which is efficient in the use of bandwidth and which, in one embodiment, provides a bounded, guaranteed time to transmission for each port.

The apparatus of the invention includes a single, shared-bus communication means and a separate logic control communicating means for propagating a one-way signal from one end of the communication bus means to the other. Each port includes receiver means for detecting signals on the bus means and transmitter means for loading information signals onto said bus means. Each port also includes interface logic means responsive to said receiver means and said control signal means for enabling said transmitter means to load information signals onto said bus means in a way which prevents collisions, and in the second embodiment, provides a bounded, guaranteed time to transmission.

The method (A1) of the invention for achieving asynchronous, collision-free communication of packets of data on a local shared bus network including bus communication means and logic control communicating means, comprises the following steps, executable by each port on the bus network prior to loading a packet onto the bus communicating means:

(1) applying a control signal to said logic control communicating means at the output of the port;

(2) delaying transmission of a packet for a time interval equal to the propagation delay time on said logic control communicating means plus the propagation delay along the bus communication means;

(3) ascertaining when said bus communication means bus is idle and said logic control means is clear of control signals at the input to the port; and then (4) transmitting a packet of data on said bus communication means and removing the applied control signal from said logic control means.

The method (A2) of the invention for achieving bounded wait, asynchronous, collision-free communication of packets of data on a local shared bus network comprises the step, additional to those of method A1 and performed before step (1), of ascertaining that said bus communication means is idle at the port for a period equal to twice the propagation delay along said bus communication means.

BRIEF DESCRIPTION OF THE DRAWINGS

In the accompanying drawings forming a material part of this disclosure:

FIG. 5 is a timing diagram illustrating the collision avoidance property of the invention.

FIG. 10 is a timing diagram further illustrating the collision avoidance property of the invention.

DISCLOSURE OF THE INVENTION

For further comprehension of the invention, and of the objects and advantages thereof, reference will be made to the following description and accompanying drawings, and to the appended claims in which the various novel features of the invention are more particularly set forth.

Figure 1:
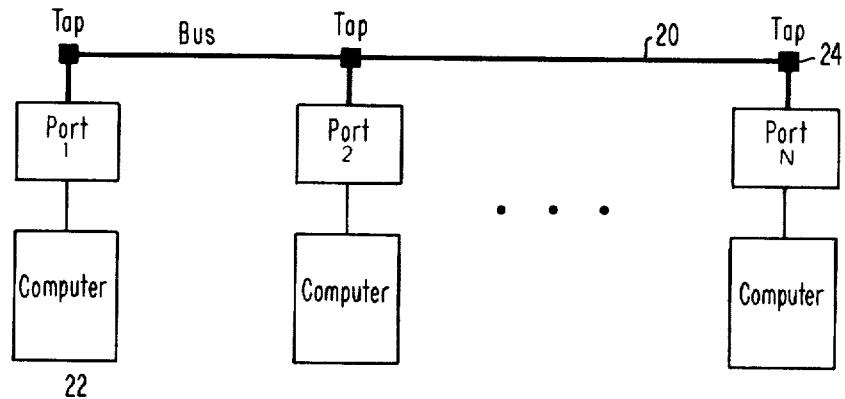
FIG. 1 is a generalized diagram of a communication bus system.
Figure 2:
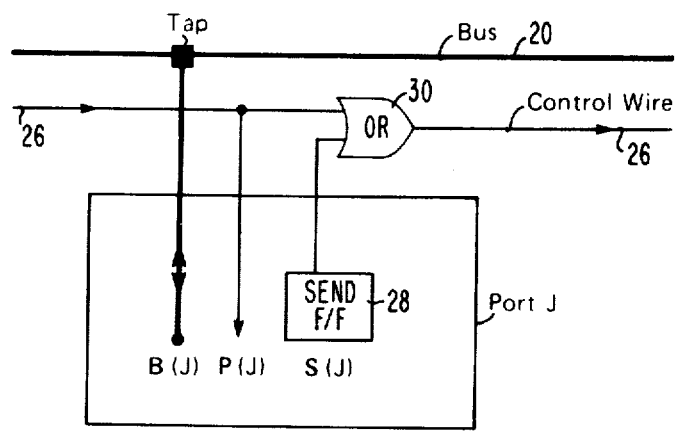
FIG. 2 is a generalized diagram of a port interface logic means.

Referring to FIGS. 1 and 2, the invention relates to a local shared bus network including a plurality of ports (Port 1, Port 2, ..., Port J, ..., Port N) for connecting a plurality of devices, such as computers 22 to shared-bus 20 through taps 24.

In addition to the single, shared-bus communication line 20, they require a separate logic control wire 26 to propagate a one-way logic signal from one end of communication bus 20 to the other over a line length of about a kilometer. Logic control wire 26 assists in the implementation of collision-free operation, but at an expense that is less than the HXDP bit-vector approach of the prior art for certain applications, and with an efficiency that is reasonably high.

As noted earlier, a packet is the unit of information transmitted or received by a port. The size (number of bits) of a packet may differ from port to port, and for an individual port J may vary over time. An individual port J observes the bus to be busy when its receiver detects signals on bus 20. This includes the case when its transmitter is generating the signals. Port J observes the bus to be idle when its receiver does not detect signals on bus 20. Because of propagation delays on the line, it is possible for some ports to observe the bus to be idle when others observe it to be busy.

In the following description of the control schemes of the invention, let N be the number of ports in the network and refer to them as ports $1, 2, \ldots, N$. For every J, ports $1, 2, \ldots, J-1$ are said to be to the left of port J, and ports $J+1, \ldots, N$ are said to be to the right of port J.

The control algorithms of the invention are distributed, have no global clock signalling, and are collision-free.

The control scheme A1, implemented in the port interface logic (also referred to as the bus access controller) of each port, achieves collision-free communication among ports. Control scheme A2 also achieves collision-free communication, and in addition provides a bounded, guaranteed time to transmission for each port. Thus, this scheme ensures that a packet which becomes available to a port for transmission will be transmitted, and that transmission will begin within a bounded amount of time. Also, the control scheme is efficient in the use of bus 20. Packets may arrive and become available to the individual ports for transmission in any manner. In particular, any port may have a next packet available for transmission immediately after the end of transmission of a current packet.

Referring further to FIG. 2, the interface logic of port J is shown, where B(J) is the bus access point for port J. Let T represent the length of time required for an electrical signal to propagate from one end of bus 20 to the other. For technical reasons, T actually represents the propagation delay along the bus plus a small (fixed) quantity. This quantity T is used explicitly in control schemes A1 and A2. For $1 \leq I, J \leq N$, the quantity $T(I,J)$ denotes the actual propagation delay along the bus between port I and port J. Thus, $T(I,J) = T(J,I)$ and by the definition of T, $T(I,J) < T$.

Although the line signalling technique for transmitting binary information along bus 20 is immaterial from the standpoint of the control scheme, a common technique is to use phase encoding of the binary data. This method has no DC component, and bit timing can be recovered from the signal itself.

Associated with each port J is send flip flop 28, denoted also by S(J). It is set to 1 and reset to 0 by port J. This flip flop S(J) is connected to control wire 26. The signal P(J), called the OR-signal, tapped at control wire 26 input to port J is the inclusive OR of the send flip flops 28, or S(J), of all ports to the left of port J.

Denote by R(J) the propagation delay along control wire 26 from port J to the rightmost port, port N. This includes delays through gates 30. Thus, if S(J) has been set to 1 at time t, for all ports $I > J$, P(I) will be equal to 1 at time $t+R(J)$, and $R(1) > \ldots > R(J) > \ldots > R(N) = 0$. Denote by $R(I,J)$ the propagation delay along control wire 26 between ports I and J, and assume that signal propagation along control wire 26 is slower than along bus 20. Specifically, assume that $R(1) > T$, and that delays along shorter sections of each path scale proportionally, i.e., for all I and J, $R(I,J) > T(I,J)$.

Figure 7:
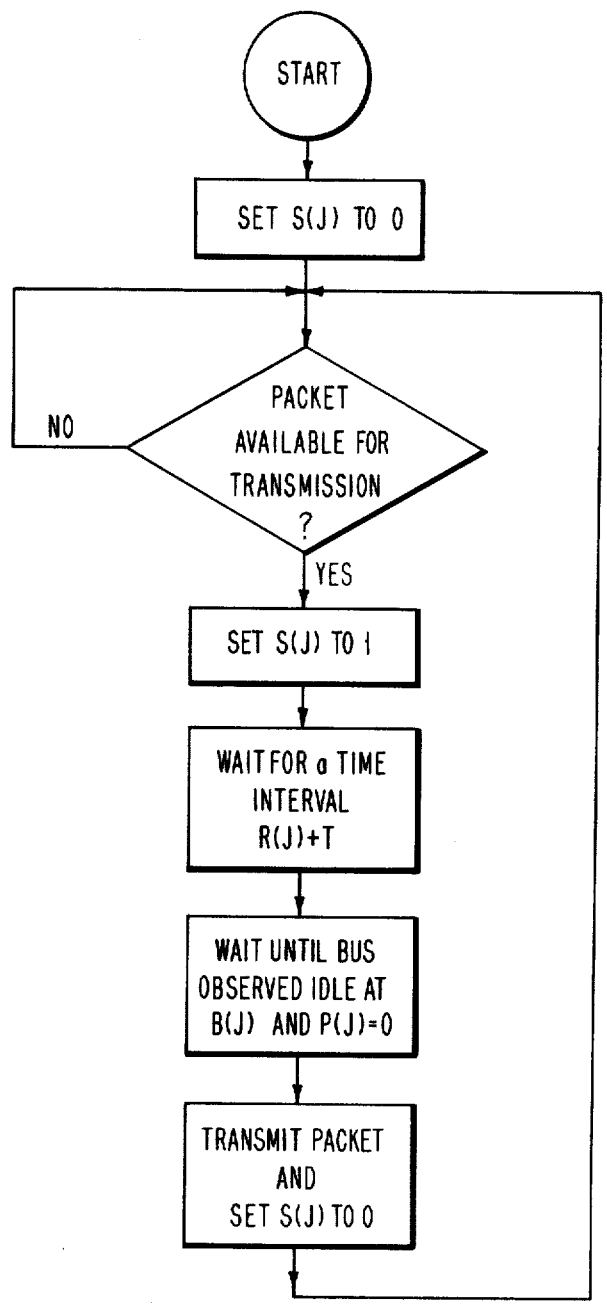
FIG. 7 is a flow chart illustrating a first embodiment (A1) of the control method of the invention.

Specification of distributed control scheme A1 is in terms of an algorithm for an individual port J. The time at which a packet arrives for transmission by port J differs from the (possibly later) time at which it becomes available to the port for transmission. Packets for transmission by port J, which arrive while an execution of the algorithm by port J is in progress, queue externally. Upon completion of this execution of the algorithm, one of any such packets immediately becomes available to port J for transmission and the next execution of the algorithm begins. Thus, for (any) port J there is at most one execution of the algorithm in progress at a time. Referring to FIG. 7, the control algorithm A1 is set forth, including the following steps:

* Set S(J) to 1.
* Wait for a time interval $R(J) + T$.
* Wait until the bus is observed (by port J) to be idle AND $P(J) = 0$; then begin transmission of the packet, simultaneously resetting S(J) to 0.

Figure 8:
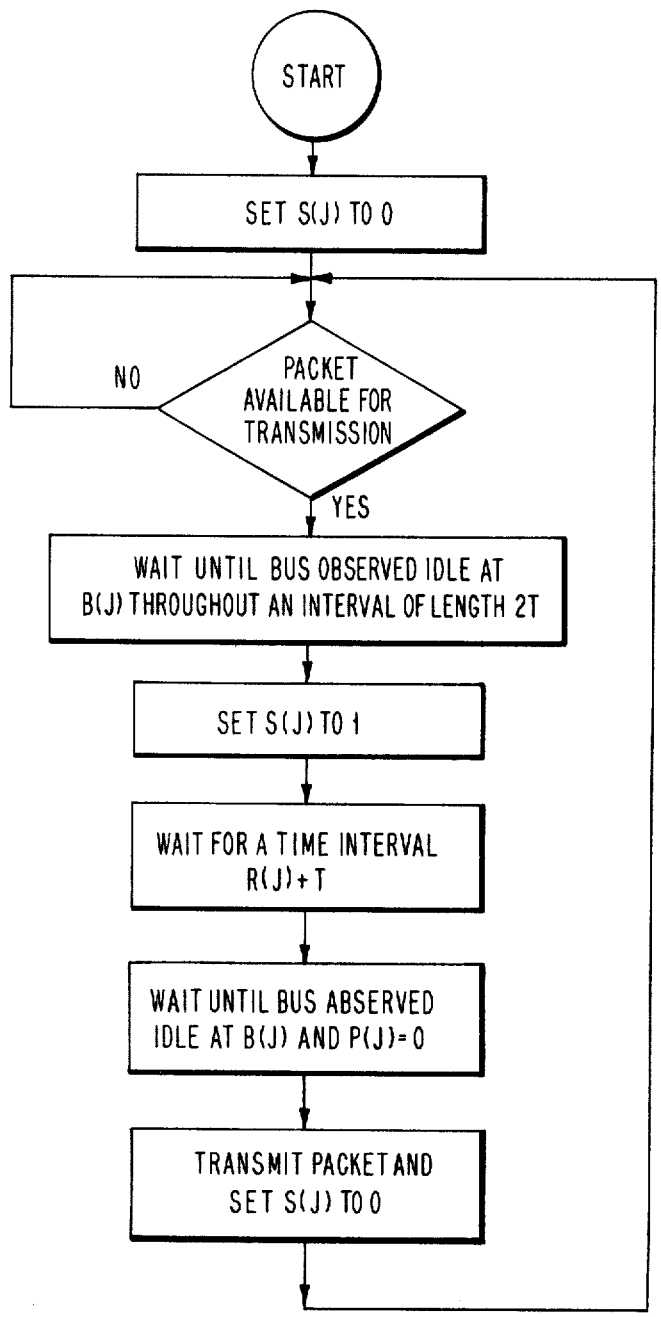
FIG. 8 is a flow chart illustrating a second embodiment (A2) of the control method of the invention.

Although, as will be shown, control scheme A1 provides collision-free communication among the ports of a bus network, in general it does not guarantee transmission of packets for all ports. Referring to FIG. 8, the second control scheme, A2, does provide a bounded, guaranteed time to transmission. Control scheme A2 is obtained from scheme A1 by adding an initial wait for the bus to be idle throughout a time interval of length 2T, and includes the following steps:

* Wait until the bus is observed (by port J) to be idle throughout a time interval of length 2T.
* Set S(J) to 1.
* Wait for a time interval $R(J) + T$.
* Wait until the bus is observed (by port J) to be idle AND $P(J) = 0$; then begin transmission of the packet, simultaneously resetting S(J) to 0.

BEST MODE FOR CARRYING OUT THE INVENTION

Figure 3:
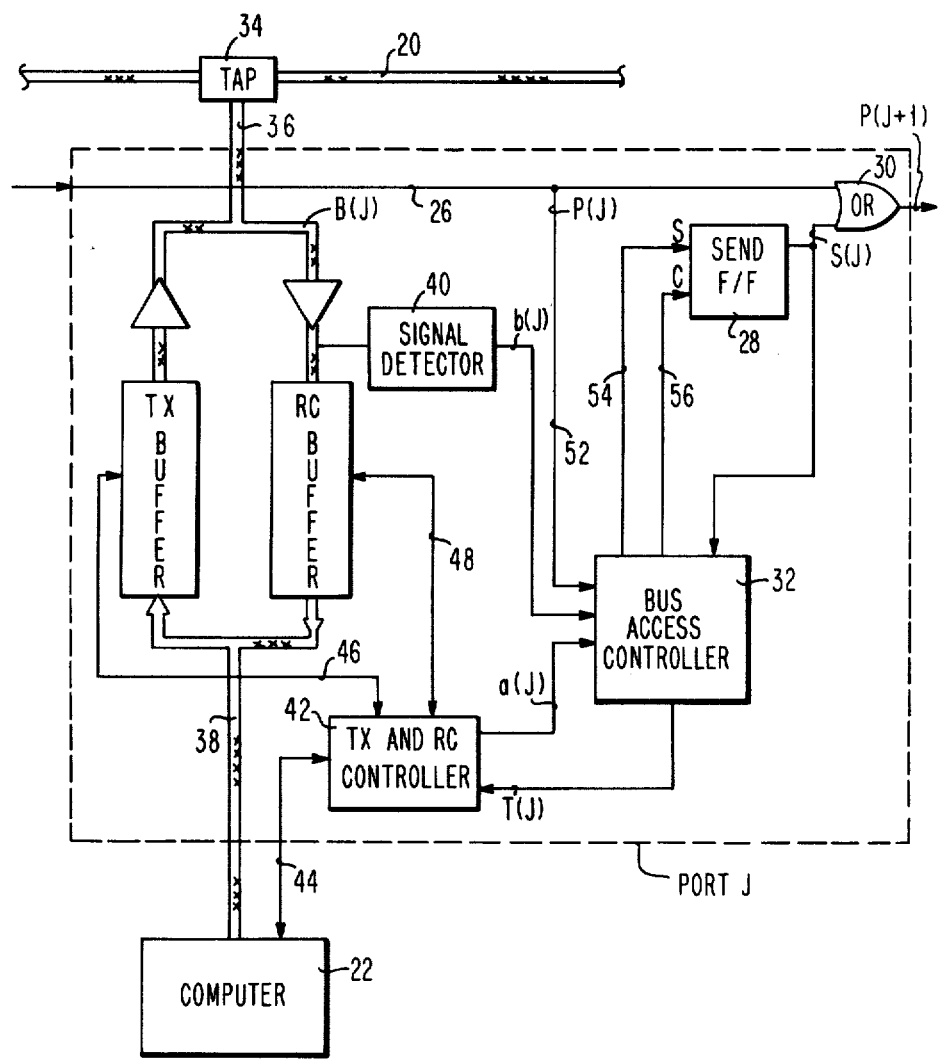
FIG. 3 is a block diagram of the port interface of FIG. 2 of the invention.
Figure 9:
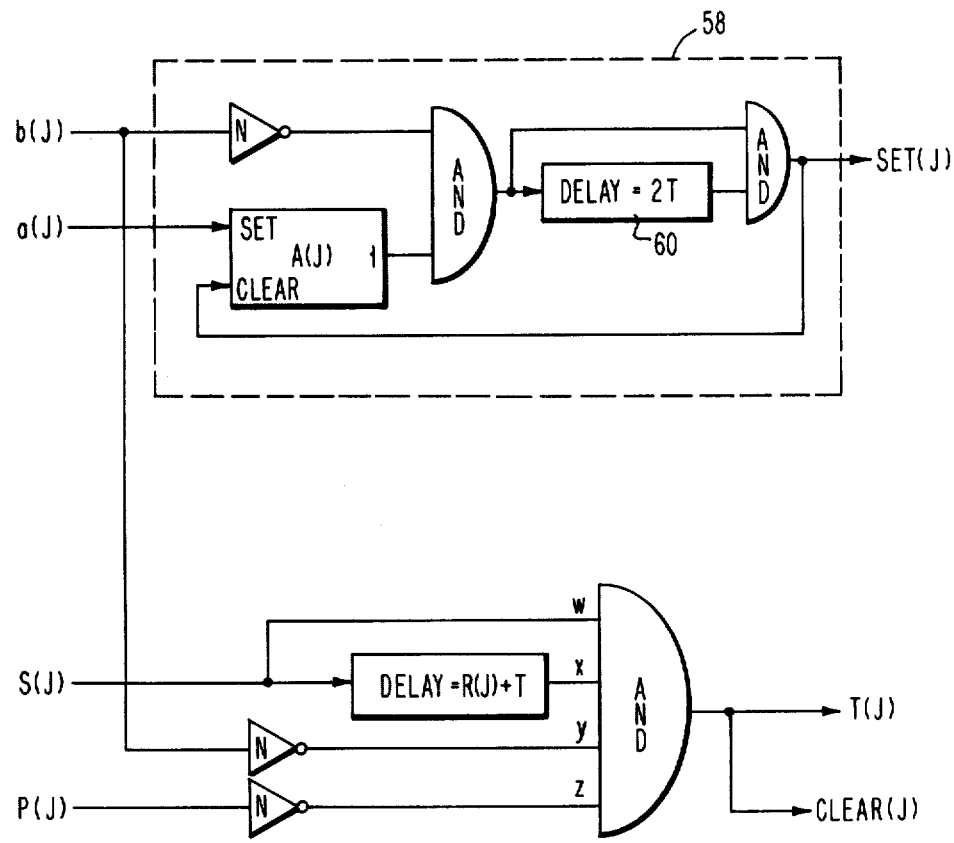
FIG. 9 is a block diagram of the bus access controller of FIG. 3.

Referring now to FIGS. 3 and 9, port logic for any port J will be described.

Bus access controller 32 includes the logic for implementing control algorithms A1 and/or A2. It may be implemented preferrably in logic gates, flip flops, and delay circuits, as shown in FIG. 9, or incorporated into the control programs executed by a microprogrammed controller used primarily to implement other port functions provided one with a sufficiently fast internal clock rate is used.

Transmit buffer TX and Receive buffer RC are connected by bus 36 to bus 20 through tap 34, and via bus 38 to computer 22. Signal detector 40 detects the presence of data B(J) on bus 36, and generates signal b(J), which is fed as one input to controller 32.

Transmit and receive controller 42 is connected to computer 22 by line 44, and to transmit TX and receive RC buffers by lines 46 and 48, respectively. Controller 42 generates signal a(J), which is an input to controller 32, and receives signal T(J) from controller 32. Line 52 is connected to control line 26, for providing signal P(J) to controller 32. Set line 54 and reset 56 are fed from controller 32 to send flip flop 28, the set S(J) output of which is fed to on circuit 30, along with control line 26, and also back to controller 32.

The inputs and outputs of controller 32 have the following logical significance:

a(J): The time of occurrence of a leading edge (0 to 1 transition) is synonymous with the time points $A_m(J)$, $m \geq 1$, defined hereafter. Controller 42 generates a(J), and it is assumed that a(J) is returned to 0 some time between $A_m(J)$ and $A_{m+1}(J)$ for each $m \geq 1$.

b(J): is 1 if bus 20 is busy and is 0 if the bus is idle. It is generated by signal detector 40, attached to B(J).

P(J): is the incoming logic control wire 26 value at port J.

S(J): is the output (true state) of send flip flop 28 of port J.

The logic outputs of controller 32 are:

T(J): The leading edge of T(J) is synonymous with "(Begin to) Transmit Packet." Therefore, T(J) must be returned to 0 by controller 32 some time before its positive going edge is required again.

SET(J): The leading edge of SET(J) sets flip flop 28 output S(J) to 1.

CLEAR(J): The leading edge of CLEAR(J) sets S(J) to 0 ("Clears" S(J)).

Referring now to FIG. 9, logic block level description of controller 32, for implementing access control algorithm A2, is shown. To derive a description of control algorithm A1, block 58 is deleted, and SET(J) is connected directly to a(J).

In operation, the circuit of FIG. 9 implements control schemes A1 and A2 as follows:

Initially, flip flops S(J) and A(J) are preset to 0 before packet transmission activity begins.

A1: The leading edge of a(J) sets S(J) to 1. After a delay of $R(J) + T$, the logic inputs w and x are both 1. Therefore, T(J) will have a 0 to 1 transition as soon as b(J) and P(J) are both 0. This achieves algorithm A1 since the AND gate output sets S(J) to 0 as well as initiating packet transmission via T(J). The input w on the AND gate is used to return T(J) (and CLEAR(J)) to 0, shortly after it goes to 1 (because s(J) goes to 0 as a result of CLEAR(J) going to 1). This satisfies the external requirement on T(J).

A2: Before S(J) is set to 1, it is necessary to wait until bus 20 is observed to be idle throughout an interval of length 2T. After S(J) is set to 1, A2 proceeds the same as A1. The A(J) flip flop is initially in the 0 state, and is set to 1 by the leading edge of a(J). The external signal a(J) can thus be returned to 0 by TX and RC controller 42. Since delay line 60 is initially in the 0 state, SET(J) undergoes a 0 to 1 transition 2T time units after b(J) goes to 0 if b(J) stays 0 throughout the 2T time interval. Logic 58 guarantees that this is the only way in which SET(J) undergoes a 0 to 1 transition. The minimum time to transmit a packet is assumed to be $\geq R(1) + T > 2T$, and, therefore, the logic of FIG. 9 works correctly in all cases (i.e., for all possible patterns of activity on b(J). In particular, assume that b(J) goes to 0 and then returns to 1 before 2T. The fact that it must now remain 1 for more than 2T guarantees that the delay line goes into the 0 state before the next transition of b(J) to 0. But now the system is back in the state it was in when a(J) went from 0 to 1, and SET(J) did not erroneously undergo a 0 to 1 transition. Finally, the leading edge of SET(J) sets A(J) to 0, subsequently clearing out the delay and resetting the system for its next use when a(J) goes 0 to 1 for the next packet.

Figure 4:
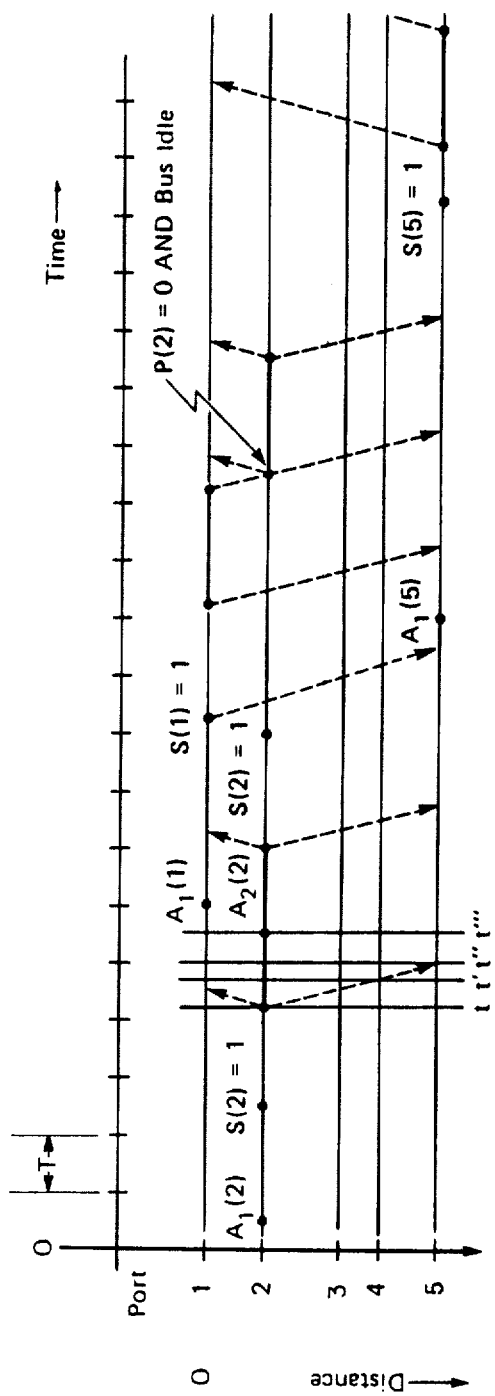
FIG. 4 is a timing diagram for an examplary five port network of the invention.

Referring to the timing diagram of FIG. 4, the manner in which events occur when several ports execute algorithm A2 asynchronously with respect to each other is illustrated. This figure pertains to a network with 5 ports that are not all uniformly spaced along bus 20. Each horizontal line is a time axis (or time line) for displaying events at a particular port (1,2,3,4,5.) Time increases to the right from an assumed 0 origin, and the unit of time is chosen to be T, the propagation delay (or signal latency) from one end of bus 20 to the other, plus some small, fixed quantity. The vertical axis represents distance along the bus, directed from left to right. The slanted, dashed arrows which intersect the port time lines connected the times at which the spatially distributed ports observe the occurrence of a particular event (e.g., start of transmission, setting of a send flip flop, etc.) at some remote port. The slopes of these arrows are consistent with the horizontal time scale and vertical distance scale. A dashed arrow emanates from an event, and its effect propagates towards the head of the arrow. For example, in FIG. 4, the leftmost downward arrow indicates that the start (at time t) of transmission by port 2 of its first packet is observed by port 4 at time t' and by port 5 at time t''. While port 2 is transmitting its first packet, a second packet arrives at time t'''. This packet becomes available to port 2 at the end of transmission of its first packet, i.e., at time $A_2(2)$. ($A_m(I)$ denotes the time at which the mth packet becomes available to port I for transmission.) Immediately after the completion of transmission of its first packet, port 2 starts the execution of algorithm A2 again, setting S(2) to 1 after observing the bus to be idle throughout an interval of length 2T. After waiting for a time interval R(2)+T, port 2 observes P(2)=1. Therefore, port 2 cannot begin transmission of its second packet, but must wait until it observes that port 1 has ended transmission and that P(2) equals 0. Port 2 begins transmission of its second packet at the time labelled "P(2)=0 AND bus idle."

Figure 6:
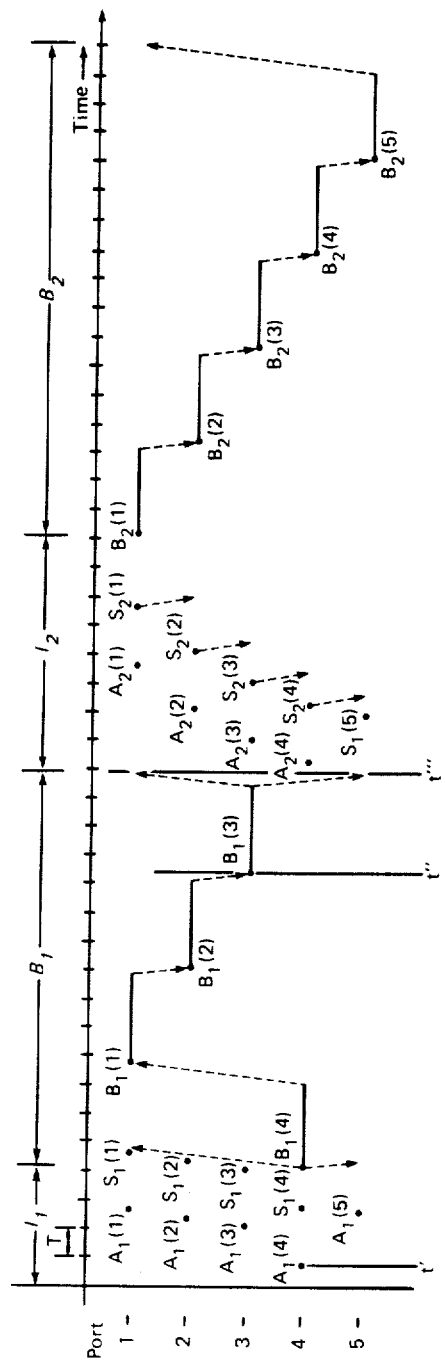
FIG. 6 is a timing diagram illustrating the bounded, guaranteed time to transmission and efficiency properties of the invention.

Referring now to FIGS. 5-6 and 10, several properties of control schemes A1 and A2 are described and established—which represent significant advances over control schemes of the prior art under certain practical conditions. The strength of the control schemes lies in these properties, and in their simplicity of implementation. Note that their properties hold without detailed assumptions regarding the mechanism by which packets arrive and become available to the individual ports for transmission.

COLLISION AVOIDANCE

In a shared-bus communication system, a collision occurs when two or more ports transmit signals that become electrically superimposed on the bus. The individual signals are destroyed in the sense that a port receiver can only observe the superposition, which is a meaningless signal. In the case of distributed control, the avoidance of collisions is nontrivial. This is because, in the absence of a proper control strategy, a port may observe the bus to be idle and begin transmission even though another port has already begun a transmission; a collision then occurs. The control schemes A1 and A2 avoid any such possibility.

That both A1 and A2 are collision-free is shown by assuming that transmission from two ports (I and J) collide, and then deducing a contradiction. Without loss of generality, suppose that $I < J$. Denote by $B_m(I)$ [resp. $B_n(J)$] the time at which port I [resp. port J] begins transmission of its mth [resp. nth] packet, and assume that these transmissions collide. Referring to FIGS. 5 and 10, there are two cases:

either $B_m(I) > B_n(J) + T$ or $B_m(I) \leq B_n(J) + T$. If $B_m(I)$ occurs after $B_n(J) + T$, port I would have observed the bus to be busy at time $B_m(I)$ and, therefore, would not have begun transmission. In the case that $B_m(I) \leq B_n(J) + T$, port J would have observed $P(J) = 1$ at time $B_m(J)$. This is because port I must have set S(I) to 1 for transmission of its mth packet no later than time $t = B_m(I) = \{R(I) + T\}$. Therefore, port J would not have begun transmission, and it is shown that a bus network with distributed control A1 or A2 is collision-free.

The requirement that an individual port I observe its OR-signal before it begins transmission prevents collision with a port to the left that is about to begin transmission. The requirement that port I wait for an interval R(I)+T before it checks to see if it can transmit prevents collision with a port to the right that is already transmitting.

By way of further explanation and proof of the collision avoidance properties of control algorithms A1 and A2 of the invention, assume that $R(1) > T$, and that for all ports I and J, $R(I,J) > T(I,J)$ and $T(I,J) = T(J,I) < T$, where R(I,J) indicates the propagation delay along control wire 26 from port I to port J, and T(I,J) indicates the propagation delay between ports I and J on bus 20.

For $1 \leq J \leq N$ and $m \geq$, let $A_m(J)$ = the time at which the mth packet becomes available to port J for transmission;

$S_m(J)$ = the time at which port J sets S(J) to 1 for transmission of its mth packet;

$B_m(J)$ = the time at which port J begins transmission of its mth packet (and resets S(J) to 0); and $E_m(J)$ = the time at which port J ends transmission of its mth packet.

The enumeration of packets for transmission by port J is according to the times at which such packets become available to the port for transmission, rather than the times of arrival. Note that if more than m packets for transmission by port J arrive in the time interval $[0, E_m(J)]$, then $A_{m+1}(J) = E_m(J)$; otherwise, $A_{m+1}(J) > E_m(J)$.

To establish and further describe the properties of control schemes A1 and A2, the following definitions are required:

DEFINITION A.1. At an arbitrary time $t \geq 0$, a port J is in phase-0 if for some $m \geq 1$, $A_m(J) \leq t - S_m(J)$; phase-1 if for some $m \geq 1$, $S_m(J) \leq t < S_m(J) + R(J) + T$; phase-2 if for some $m \geq 1$, $S_m(J) + R(J) + T \leq t < B_m(J)$; and phase-3 if for some $m \geq 1$, $B_m(J) \leq t < E_m(J)$. Orherwise, port J is idle at time t.

DEFINITION A.2. Port J observes the bus to be busy at an arbitrary time $t \geq 0$ if for some $m \geq 1$ and some I, $1 \leq I \leq N$, $$B_m(I) \leq t - T(I,J) < E_m(I);$$

otherwise, port J observes the bus to be idle at time t.

Note that if I=J, then (T(I,J)=0; thus, according to this definition, port J observes the bus to be busy throughout its own transmissions.

DEFINITION A.3. Port J observes P(J)=1 at an arbitrary time $t \geq 0$ if for some $m \geq 1$ and some I, $1 \leq I < J$, $S_m(I) \leq t - R(I,J) < B_m(I)$;

otherwise, port J observes $P(J)=0$ at time t.

DEFINITION A.4. A collision occurs (with a particular control scheme) if, for two ports I and J and some $m,n \geq 1$, there exists t such that $B_m(I) - T(I,J) \leq t < E_m(I) + T(I,J)$ and $B_n(J) \leq t < E_n(J)$ A bus network is said to be collision-free if no collisions occur.

THEOREM A.5. A bus network with control scheme A1 or A2 is collision-free.

To prove theroem A.5, assume that a collision occurs, and let I, J and $m,n \geq 1$ be as in Definition A.4. Without loss of generality, assume that $I < J$.

Case (i): $B_n(J) \leq B_m(I) - T(I,J)$.

Since a collision occurs, $E_n(J) > B_m(I) - T(I,J)$. But then $B_n(J) \leq B_m(I) - T(I,J) < E_n(J)$, and by Definition A.2, port I would have observed the bus to be busy at time B (I). Therefore, port I would not have begun transmission, a contradiction.

Case (ii): $B_n(J) \geq B_m(I) + T(I,J)$.

Since a collision occurs, $B_n(J) < E_m(I) + T(I,J)$. But then $B_m(I) \leq B_n(J) - T(I,J) < E_m(I)$, and port J would have observed the bus to be busy at time $B_n(J)$. Therefore, port J would not have begun transmission, a contradiction.

Case (iii): $B_m(I) - T(I,J) < B_n(J) < B_m(I) + T(I,J)$.

Since port I begins transissions at time $B_m(I)$, $S(I)=1$ throughout the time interval $[B_m(I) - R(I) - T, B_m(I)]$. Consequently, since $I<J$, port J would have observed $P(J)=1$ throughout the time interval $[B_m(I) - T, B_m(I) + R(I,J)]$; but this interval contains $B_n(J)$, since $B_m(I) - T(I,J) < B_n(J) < B_m(I) + T(I,J)$ and $R(I,J) > T(I,J)$. Therefore, port J would not have begun transmission, a contradiction.

Thus, control schemes A1 and A2 are collision-free.

Guaranteed Time To Transmission

Although control scheme A1 is collision-free (irrespective of the fine structure of the mechanism which determines when packets arrive and become available to the individual ports for transmission), in general it does not provide a guaranteed time to transmission for all ports.

By way of example, consider a network that has three ports and operates with control scheme A1. Let the time to transmit any packet be greater than R(1). Assume that when transmission of a packet by a port ends, a next packet immediately becomes available to that port for transmission. Begin observation of the network at a time at which port 1 start to transmit a packet and each of the other ports has its send flip flop set to 1. Then port 3 (the rightmost port) never transmits a packet because it never observes the bus to be idle and P(3) to be 0 simultaneously. Note that there is a guaranteed time to transmission for ports 1 and 2, but not for port 3.

The initial wait for the bus to be idle throughout a time interval of length 2T has an important consequence in control scheme A2 of the invention; namely, it guarantees transmission of all packets, provided that the time to transmit any packet is greater than $R(1)+T$.

That control scheme A2 provides guaranteed time to transmission for each port will next be shown. Assume that there is a packet available to port J at some time t. That eventually (i.e., within a finite amount of time) port J observes the bus to be idle throughout a time interval of length 2T, and thus port J is able to set its send flip flop S(J) to 1, is first shown. The, that having set S(J), port J eventually begins transmission of its packet, will be shown.

In accordance with the control algorithm (A2) of FIG. 8, if port J observes the bus to be idle throughout the time interval [t,t+2T], then it sets S(J) to 1; otherwise, within the interval [t,t+2T], port J observes transmission of a packet by some other port I. Now consider the set Q(I) of all ports other than I that have set their flip flops before they observe port I's transmission. Since by assumption, the time to transmit any packet is greater than $R(1)+T$, after completion of transmission by port I, the ports in Q(I) transmit their packets in left to right port order. When port I and the ports in Q(I) are transmitting, no port can observe the bus to be idle throughout a time interval of length 2T. Thus, there are no flip flops set to 1 when the last (rightmost) port in Q(I) ends transmission. All ports can now observe the bus to be idle throughout a time interval of length 2T. In particular, port J can set S(J) to 1. The time from t until port J sets S(J) to 1 is longest when the set $\{I\} \cup Q(I)$ consists of all $N-1$ ports other than J.

Having set S(J), port J waits (independently of other activity in the network) for a time interval of length $R(J)+T$. Let t' denote the time at which this wait ends. After time t', no port to the right of port J can begin transmission of a packet until port J transmits its packets and resets S(J) to 0. Suppose that port J does not begin transmission at time t', and denote by t" the first time greater than or equal to t' at which a transmission ends. Since the time to transmit any packet is greater than $R(1)+T$, each port that has set its flip flop (as well as port J) is waiting to observe the bus to be idle and for its OR-signal to be 0. Denote the set of these ports by W, and observe that the ports in W transmit one after another in left to right order. At most, each of the $J-1$ ports to the left of port J transmits a packet before port J transmits its packet. The worst-case delay for port J prior to beginning transmission occurs when the waiting intervals for ports in the set W overlap the least.

Thus, a bus network with control scheme A2 provides guaranteed time to transmission for each port. If, in addition to being finite, the times to transmit a packet are bounded, then the control scheme provides a bounded, guaranteed time to transmission.

To illustrate that the initial wait for the bus to be idle for a time interval of length 2T assures transmission of all packets, consider the bus network with three ports in the Example given above. Assume that the network operates under control scheme A2 and that port 2 is equidistant from ports 1 and 3. When transmission of the initial packet by port 1 ends at, say, time t, port 2 has set S(2) and has waited for a time interval of length $R(2)+T$, and port 3 has set S(3) and has waited for a time interval of length $R(3)+T$. Then at time $t+T/2$, port 2 observes the bus to be idle and $P(2)=0$. Therefore, port 2 begins to transmit. Note that port 1 observes the bus to be idle throughout the time interval $[t,t+T]$; but then it observes the transmission by port 2, and consequently cannot yet set S(1) to 1 preparatory to transmitting its second packet. Port 3 observes the bus to be idle and $P(3)=0$ at time T/2 following the end of transmission by port 2, and begins transmission. When each of the ports observes the bus to be idle (for a time interval of length 2T) after port 3 ends transmission, it sets its send flip flop, and subsequent packet transmissions from ports 1, 2, and 3 proceed.

Referring to FIG. 6, the best (least upper) bound for the guaranteed time to transmission, that is, how long transmission of an available packet can be delayed is illustrated. Consider a specific 5-port network, and suppose that the time to transmit any packet is P, where $P > R(1) + T$. FIG. 6 shows a series of events which gives rise to a worst-case time to transmission for port 5. In this illustration, at time $A_1(5)$ a first packet becomes available to port 5 for transmission. Although port 5 observes the bus to be idle at this time, port 4 begins transmission of a packet at time $B_1(4)$ and the transmission is observed by port 5 just before time $A_1(5) + 2T$, so that port 5 is unable to set $S(5)$ to 1. Successively, ports 4, 1, 2, and 3 transmit packets. At time $t''' + 2T = S_1(5)$, port 5 has observed the bus to be idle throughout a time interval of length 2T and now sets $S(5)$. It then waits for a time interval of length T (because $R(5) = 0$), at which time it observes $P(5) = 1$, because port 5 has set $S(5)$ to 1. Port 4 cannot begin transmission after setting $S(4)$ and waiting for a time interval of length $R(4) + T$ (since it observes $P(4) = 1$ because port 3 has set $S(3)$, etc.). Eventually, ports 1, 2, 3, and 4 each transmit a packet before port 5 observes the bus to be idle and $P(5) = 0$. Finally, port 5 begins transmission. Note that with this series of events, all ports other than port 5 transmit 2 packets after time $A_1(5)$ before port 5 begins transmission of its packet.

The example of FIG. 6 generalizes to the N-port case, and the following detailed analysis of the general situation establishes that if the time to transmit a packet is P, the guaranteed time to transmission for port J in a bus network with control scheme A2 is bounded above by $$(J + 6)T + T(1,J) + R(J) + (N + J - 1)P + \sum_{i=2}^{J} R(i)$$

DEFINITION A.6. Thus, the bus is busy at an arbitrary time $t \geq 0$ if for some port J, $1 \leq J \leq N$, and some $m \geq 1$, $$B_m(J) \leq t < E_m(J) + \max\{T(J,1), T(J,N)\};$$

otherwise, the bus is idle.

Based on this definition A.6, for $t \geq 0$ we write $$\text{BUSY}(t) = \begin{cases} 1 & \text{if the bus is busy at time } t \\ 0 & \text{otherwise} \end{cases}$$

In accordance with Definition A.1, for $1 \leq J \leq N$ and $t \geq 0$ we write $$\text{IDLE}(J;t) = \begin{cases} 1 & \text{if port } J \text{ is idle at time } t \\ 0 & \text{otherwise} \end{cases}$$

It is convenient to introduce three sequences of times $\{i_n : n \geq 1\}$, $\{a_n : n \geq 1\}$ and $\{b_n : n \geq 1\}$, where $i_n$ is the start time of the nth bus idle interval, $a_n$ is the earliest time in the nth bus idle interval at which a packet is available to some port for transmission, and $b_n$ is the start time of the nth bus busy interval. Formally, assume that BUSY(0) = 0 and define $$i_1 = 0,$$

$$a_n = \inf\{t \geq i_n : \text{for some } J, \text{IDLE}(J;t) = 0\}, n \geq 1,$$

$$b_n = \inf\{t > i_n : \text{BUSY}(t) = 1\}, n \geq 1,$$

and $$i_n = \inf\{t > b_{n-1} : \text{BUSY}(t) = 0\}, n \geq 2.$$

Then, for $n \geq 1$, the nth bus idle interval $I_n$ is the time interval $I_n = [i_n, b_n)$; the nth bus busy interval $B_n$ is the time interval $B_n = [b_n, i_{n+1})$; and the nth bus cycle $C_n$ is the time interval $C_n = [i_n, i_{n+1})$.

LEMMA A.7. Assume that the time to transmit any packet is greater than $R(1) + T$. Also suppose that in a bus busy interval the first port to transmit a packet is port J, beginning at time $B_m(J)$. Let $Q(J)$ be the set of all other ports I that are in phase-1 or phase-2 at time $B_m(J) + T(J,I)$. Then following time $E_m(J)$, in left to right order each of the ports in $Q(J)$ transmits a packet, and no other transmissions occur during this bus busy interval.

Proof: First observe that each port I in the set $Q(J)$ is in phase-2 at time $E_m(J) + T(J,I)$ because each was in phase-1 or phase-2 at time $B_m(J) + T(J,I)$ and the time to transmit any packet is greater than $R(1) + T$. If $Q(J)$ is empty, there is nothing to prove, and Lemma A.7 is trivially true if $Q(J)$ is a singleton. Therefore, suppose that there are at least two ports in $Q(J)$ and denote the leftmost of these by L and the rightmost by M. Each port I in $Q(J)$ observes the bus to be idle at time $E_m(J) + T(J,I)$. However, each port I other than L in $Q(J)$ also observes $P(I) = 1$ at time $E_m(J) + T(J,I)$; this is because $S_n(L) \leq B_m(J) + T(J,L)$ and $\{E_m(J) + T(J,M)\} - \{B_m(J) + T(J,L)\} > R(1) + T + T(J,M) - T(J,L) \geq R(1)$. Therefore, port L begins transmission of its nth packet at time $B_n(L) = E_m(J) + T(J,L)$. Next, the leftmost port K in $Q(J) - \{L\}$ begins transmission at time $E_n(L) + T(L,K)$. This is because port K is the only port in $Q(J) - \{L\}$ for which $P(K)$ is 0 when it observes the end of transmission by port L. This pattern of transmissions (in left to right port order) by the ports in $Q(J)$ continues until port M has transmitted its packet, and then the bus busy interval ends. To prove this, it is necessary to show that no port I ($1 \leq I \leq N$) in the network can set $S(J)$ to 1 in the time interval $[B_m(J) + T(J,I), E_k(M) + \max\{T(M,1), T(M,N)\})$.

To show that no port I can set $S(I)$ to 1 in the time interval $[B_m(J) + T(J,I), E_k(M) + \max\{T(M,1), T(M,N)\})$, first note that in a bus busy interval a port can observe the bus to be idle only between successive transmissions. Let t be the time at which some port in $\{J\} \cup Q(J)$ ends transmission, and denote by $t'$ the time at which a next transmission begins (by some port I'), and by $t''$ the time at which an arbitrary port I observes the beginning of this transmission. Time t is the earliest time at which port I can begin to observe the bus to be idle. By the argument used at the start of the proof, $t' - t \leq T$. Certainly, $t'' - t + \leq T$, and since $T(I',I) > T$ for all I', in fact $t'' - t' < T$. Therefore $t'' - t < 2T$, and the Lemma A.7 is true.

The following example clarifies the need for the assumption (used in Lemma A.7) that $T(I',I) < T$ for any I' and I. Suppose that the set $Q(J)$ consists of ports 1 and N. Then L=1 and port 1 observes the bus to be idle from time $E_n(1)$ to time $E_n(1)+T(1,N)+T(N,1)$, i.e., throughout a time interval of length $2T(1,N)$. If $2T(1,N)=2T$, the Lemma is false.

The proof of Lemma A.7 makes explicit the pattern of transmissions that occur during a bus busy interval; namely, after an initial transmission by some port J, in left to right order the ports in the set Q(j) each transmit one packet. We refer to this pattern in the discussions that follow.

LEMMA A.8. Assume that the time to transmit a packet is greater than $R(1)+T$ but less than or equal to $P_{max}$. Then for any port J and $m \geq 1$, $$S_m(J) - A_m(J) < 6T + (N-1)P_{max}$$

and $$B_m(J) - S_m(J) \leq J(T + P_{max}) + T(1,J) + R(J) + \sum_{i=2}^{J} R(i).$$

Proof: Port J sets S(J) at time $A_m(J)+2T$ provided that it observes the bus to be idle throughout the time interval $[A_m(J), A_m(J)+2T)$. Otherwise, suppose that it observes the bus to be busy due to transmission by port $I \neq J$. By the arguments in the proof of Lemma A.7, port J does not set S(J) until port I and each of the ports in the set Q(I) have transmitted their packets. Define L to be the leftmost port in Q(I) and M the rightmost port. (If Q(I) is empty, define L=M=I; if Q(I) is a singleton L, define M=L). Port J sets S(J) to 1 at time $E_k(M)+T(M,J)+2T$. It follows that $$S_m(J) - A_m(J) < 2T - T(I,J) + P_{max} + T(I,L) +$$
$$|Q(I)|P_{max} + T(L,M) + T(M,J) + 2T =$$
$$4T + \{|Q(I)| + 1\} P_{max} + D,$$

where $$D = T(I,L) + T(L,M) + T(M,J) - T(I,J),$$

and $|Q(I)|$ denotes the cardinality of the set Q(I). It is apparent that $D \leq 2T$. Therefore, since $\{|Q(I)| + 1\} \leq N - 1$, $$S_m(J) - A_m(J) < 6T + )N - 1)P_{max},$$

and the first part of Lemma A.7 is established.

Having set S(J) at time $S_m(J)$, port J begins transmission at time $t = S_m(J) + R(J) + T$, provided that at time t it observes the bus to be idle and $P(J) = 0$. Otherwise, denote by I the first port that transmits in the ensuing bus busy interval. Then, by definition of the set Q(I), $J \in Q(I)$ and there are two cases: either $I > J$ or $I < J$. First suppore that $I > J$. The value of $B_m(J) - S_m(J)$ is largest when Q(I) contains ports $1, 2, \ldots, J$. Direct calculation shows that $$B_m(J) - S_m(J) \leq R(J) + T - T(I,J) +$$
$$P_{max} + T(I,1) + (J-1)P_{max} + T(1,J) =$$
$$R(J) + T + JP_{max} + 2T(1,J).$$

Now suppose that $I < J$. The value of $B_m(J) - S_m(J)$ is largest when $I = 1$ and the overlap among the $2T + R(K) + T$ waiting intervals of the ports K in the set $\{1, 2, \ldots, J\}$ is least. Here $$B_m(J) - S_m(J) \leq R(J) + T(1,J) + JT + (J-1)P_{max} + \sum_{i=2}^{J} R(i).$$

The upper bound obtained for $I > J$ dominates when $J = 1$ or 2; for $J \geq 3$, the bound for $I < J$ dominates. Replacing the term $(J-1)P_{max}$ in the bound for $I < J$ by $JP_{max}$, the second part of Lemma A.7 follows.

THEOREM A.9. If the time to transmit any packet is greater than $R(1)+T$, a bus network with control scheme A2 provides guaranteed time to transmission for each port. If, in addition, the time to transmit any packet is less than or equal to $P_{max}$, then the guaranteed time to transmission for port J is bounded above by $$(J + 6)T + T(1,J) + R(J) + (N + J - 1)P_{max} + \sum_{i=2}^{J} R(i)$$

Proof: Combining the two bounds from Lemma A.8, the time to transmission for port J is obtained directly as $$B_m(J) - A_m(J) = \{S_m(J) - A_m(J)\} + \{B_m(J) - S_m(J)\}$$
$$< 6T + (N-1)P_{max} + J(T + P_{max}) + T(1,J) + R(J) + \sum_{i=2}^{J} R(i)$$
$$= (J + 6)T + T(1,J) + (N + J - 1)P_{max} + R(J) + \sum_{i=2}^{J} R(i).$$

Consider next the efficiency of control scheme A2. To define the efficiency of control scheme A2, it is necessary to consider intervals of time during which some transmitter is actively transmitting a packet, and intervals of time during which the bus is idle while at least one port has a packet available for transmission. The appropriate point of view when developing the collision-free and guaranteed time to transmission properties of the control scheme is to consider only the notion of an individual port observing the bus to be idle. However, with respect to efficiency, it is more convenient to adopt port-independent definitions.

The bus is considered to be busy if there is packet data propagating along any part of the bus; otherwise, the bus is idle. Clearly, according to this definition the bus is busy whenever some port is transmitting a packet. Note, however, that the bus is also considered to be busy after a port has ended transmission while packet data is still propagating. Also, during these latter time intervals it is possible for some ports to observe no signalling on the bus; any such port having a packet available for transmission could begin transmission without leading to a collision. Whether or not transmission in fact begins in these circumstances is determined by the control algorithm and the past history of events. Similarly, some port I may complete a waiting interval of length 2T and set its send flip-flop after some other port has begun transmission but before port I has observed the beginning of this transmission.

Referring now to FIG. 6, the bus is idle throughout the time intervals $I_1$ and $I_2$, and is busy throughout the intervals $B_1$ and $B_2$. Moreover, at time t", for the packet available to it, port 3 observes the bus to be idle and begins transmission. At time t''', port 5 observes the bus to be idle, but does not begin transmission of the packet available to it.

A definition of the efficiency of control scheme A2 now follows. As activity in the bus network evolves in time, bus idle intervals $I_1, I_2, \ldots$, and bus busy intervals $B_1, B_2, \ldots$, strictly alternate. Denote by $C_n$ the interval consisting of the bus idle interval $I_n$ and the immediately following bus busy interval $B_n$, and term such an interval a bus cycle. Note that at the beginning of a bus idle interval $I_n$ there is a (possibly degenerate) time interval in which no packets are available for transmission. Denote by $[a_n,b_n)$ the remaining interval during which at least one packet is available, but no transmission has yet begun. For the interval $I_1$ in FIG. 6, $[a_1,b_1)=[t',B_1(4))$.

As before, assume that P, the time to transmit a packet, satisfies $P>R(1)+T$. For any bus cycle $C_n$, define the efficiency $E(C_n)$ of control scheme A2 according to $$E(C_n)=k_nP/\{k_nP+b_n-a_n\},$$

where $k_n$ is the number of packets transmitted during the bus busy interval $B_n$. The range of $k_n$ is clearly $1 \leq k_n \leq N$ since each port transmits at most one packet during any bus cycle.

For any bus cycle $C_n$, the efficiency of control scheme A2 is smallest when the overlap among the various port waiting intervals in the bus idle interval $I_n$ is least. The bus idle interval $I_2$ of FIG. 6 illustrates a least overlap situation. Extrapolating from this example, in general $$b_n - a_n \leq 2T + k_nT + \sum_{i \in V_n} R(i),$$

where $V_n$ is the set of $k_n$ ports that transmit during the bus busy interval $B_n$.

Thus, in any bus cycle $C_n$, the efficiency of control scheme A2 is greater than or equal to $$k_nP/\left( k_nP + 2T + k_nT + \sum_{i \in V_n} R(i) \right),$$

where $V_n$ is the set of $k_n$ ports that transmit during the bus busy interval $B_n$.

From this result it follows that the efficiency in a bus cycle is greater than or equal to $$P/\{P+R(1)+3T\} \text{ if } k_n=1$$

and $$P/\{P+R(1)+2T\} \text{ if } k_n \geq 2,$$

so that the worst-case efficiency occurs when only one port transmits in a bus cycle.

It is instructive to calculate values of the worstcase efficiency for specific situations. For example, assume a bus transmission speed of 3 megabits per second. Assuming speed of light transmission, if the bus is 1 kilometer long, T is approximately 3.34 microseconds. Let $R(1)=5$ microseconds and suppose that all packets are 256 bytes long. Accordingly, the time to transmit a packet P is $(256 \times 8/3 = 632.67$ microseconds. Then the worst-case efficiency of control scheme A2 in a bus cycle is 0.978. Because $R(1)+T=8.34$ microseconds, a minimum packet size of more than 25 bits, say 4 bytes, is required to guarantee transmission. Operating with 4-byte packets results in a worst-case efficiency of 0.415. Table 1 gives values of the worst-case efficiency for a range of packet sizes for bus bandwidths of 3 and 5 megabits per second.

TABLE 1

Lower bound on efficiency of control scheme A2.
Length of bus = 1 kilometer
$R(1) = 5$ microseconds.

| LENGTH OF PACKET (BYTES) | BUS BANDWIDTH (MEGABITS/SEC.) | |
|---|---|---|
| | 3 | 5 |
| 4 | .415 | .299 |
| 8 | .587 | .460 |
| 16 | .740 | .630 |
| 32 | .850 | .773 |
| 64 | .919 | .872 |
| 128 | .958 | .932 |
| 256 | .978 | .964 |
| 512 | .989 | .982 |

The above definition of efficiency does not include those intervals of time during which the bus is busy but no transmitter is active. If such intervals are included in both the numerator and the denominator, the efficiency values increase. In this sense, the definition of efficiency used here is conservative. Differences in calculated values of efficiency due to different handling of such intervals are minor when $P>>T$, which is the usual case in practice.

Control schemes A1 and A2 make explicit use of the values $T,R(1), \ldots, R(N)$. In an implementation of the control schemes, exact values for these quantities may not be available. The two control schemes, however, retain the properties noted previously if quantities larger than the actual T and R(J) values are used. It is then possible to take all R(J) values to be the same and larger than R(1) if it is desirable that the algorithm implemented in each port be the same.

The two control schemes are quite similar, but scheme A2 provides bounded, guaranteed time to transmission and scheme A1 does not. However, it is expected that in a bus network with control scheme A1, when the network is lightly loaded, only infrequently must a port wait more than one packet transmission time prior to transmission of its packet.

The waiting interval of length $R(J)+T$ for port J in control schemes A1 and A2 is minimal; i.e., it is not possible for the ports to wait less than these amounts of time and preserve collision avoidance. Similarly, the waiting interval throughout which a port must observe the bus to be idle prior to setting its send flip-flop cannot be less than 2T. If the waiting interval is smaller, control scheme A2 does not provide a guaranteed time to transmission.

The requirement that the time to transmit any packet be greater than $R(1)+T$ is essential if control scheme A2 is to provide guaranteed time to transmission. Note, however, that this is not restrictive in practice; e.g., with a bus bandwidth of 3 megabits per second and $R(1)=5$ microseconds, scheme A2 guarantees transmission on a 1 kilometer bus provided that the minimum packet size is at least 4 bytes. With a bus bandwidth of 5 megabits per second, a minimum packet size of 8 bytes suffices.

Finally, observe that with control scheme A2, each port gets an equal share of the bus. Specifically, suppose that when each port ends transmission of a packet, a next packet immediately becomes available to the port for transmission. Then each port transmits a packet in every bus busy interval. In this sense, control scheme A2 is fair.

BEST MODE FOR CARRYING OUT THE INVENTION

In FIGS. 3 and 9, and previously described, a hardware embodiment of a bus access controller for implementing control algorithms A1 or A2 is set forth. Algorithms A1 and A2 both provide asynchronous, collision-free control on a local, contention bus. Algorithm A2 also provides a bounded, guaranteed time to transmission.

As would be apparent to those skilled in the art, the bus access controller could be made adaptive to the load on the bus to switch between control algorithms A1 and A2. Also, that one or more ports implementing control algorithms A1 could coexist on the same bus with ports implementing control algorithm A2, without loss of collision-free operation but at the loss of the bounded, guaranteed time to transmission.

INDUSTRIAL APPLICABILITY

The apparatus and method of the invention is applicable to data communication on a local shared bus network. Such is advantageous for interconnecting minicomputers or other such devices in a terminal, distributed processing, or process control system where the total length of the communication bus is on the order of one kilometer.

While the invention has been particularly shown and described with reference to the preferred embodiments thereof, it will be understood by those skilled in the art that the foregoing and other changes in form and details may be made therein without departing from the spirit and scope of the invention.

Having thus described our invention, what we claim as new, and desire to secure by Letters Patent is:

1. Method for attaining asynchronous, collision-free data signal communication on a local shared bus network interconnecting a plurality of transceiving ports, each port executing the steps of:
   (1) signalling an intention to transmit a message;
   (2) delaying transmission for a period equal to the total bus latency plus the propagation delay of an intention to transmit signal;
   (3) ascertaining that no signals indicating an intention to transmit, and no data signals, are being received at said each port; and then
   (4) sending the message.

2. Method for attaining bounded wait, asynchronous, collision-free data signal communication on a local shared bus network interconnecting a plurality of transceiving ports, each port executing the steps of:
   (1) ascertaining that no data signals are being received at said each port throughout a period equal to twice the total bus latency;
   (2) signalling an intention to transmit a message;
   (3) delaying transmission for a period equal to the total bus latency plus the propagation delay of an intention to transmit signal;
   (4) ascertaining that no signals indicating an intention to transmit, and no data signals, are being received at said each port; and then
   (5) sending the message.

3. Method for enabling asynchronous, collision-free communication of packets of data between ports on a local shared bus network including a data bus and a control line, wherein each port prior to sending a packet executes the steps of:
   applying a control signal to said control line;
   delaying transmission for a time interval equal to the propagation delay along the control line from said each port to the last port plus the length of time required for an electrical signal to propagate from one end of said data bus to the other;
   ascertaining when said data bus is idle and said control line is free at said each port of signals from other ports; and then
   transmitting a packet of data on said data bus and removing said control signal from said control line.

4. Method for enabling asynchronous, bounded wait, collision-free communication of packets of data between ports on a local shared bus network including a data bus and a control line, wherein each port prior to sending a packet executes the steps of:
   ascertaining that said data bus is unoccupied, as observed at the port, for a period equal to twice the signal propagation delay along the entire length of said data bus;
   applying a control signal to said control line;
   delaying transmission for a period equal to the propagation delay along said control line from said each port to the last port plus the propagation delay along the entire length of said data bus;
   ascertaining when said data bus is idle and said control line is free at said each port of signals from other ports; and then
   transmitting a packet of data on said data bus and removing said control signal from said control line.

5. A communications method for attaining collision-free transmission for each asynchronously operated transceiving port of an ensemble of N ports $(1, 2, 3, \ldots, J, \ldots N)$, each port coupling a common communications path of latency T, each port including means for detecting the signal occupancy of the path and further being adapted to send and receive any length messages; wherein each port J prior to sending a message executes the steps of:
   (1) signalling the ports $J+1, J+2, \ldots, N$ of an intention to transmit;
   (2) delaying sending the message for a period equal to the signal path latency from port J to port N plus the signal path latency T;
   (3) thereafter ascertaining that no signal indicating an intention to transmit is being received at port J from any of ports $1, 2, \ldots, J-1$, and that said common communication path at port J is unoccupied; and then
   (B 4) sending the message.

6. A communication method for attaining bounded wait collision-free transmission for each asynchronously operated transceiving port of an ensemble of N ports $(1, 2, 3, \ldots, J, \ldots N)$, each port coupling a common communications path of latency T, each port including means for detecting the signal occupancy of the path and further being adapted to send and receive messages; wherein each port J prior to sending a message executes the steps of:
   (1) ascertaining the common communication path condition as being unoccupied for a period 2T; then (2) signalling the ports J+1, J+2, ... ,N of an intention to transmit;
(3) delaying transmission for a period equal to the intention signal latency from port J to port N plus the communication path latency T;
(4) ascertaining that no signal indicating an intention to transmit is being received at port J from any of ports 1,2, ... ,J−1, and that said common communication path at port J is unoccupied; and then
(5) sending the message.

7. Method for attaining asynchronous, collision-free communication of data packets on a local shared bus network interconnecting a plurality of N ordered transceiving ports (1,2,3, ... ,J, ... N), the bus network including a data bus of latency T and a control wire having a propagation delay from port J to port N of R(J), each port J including means for ascertaining the presence of a data packet on said data bus at said port J, and further being adapted to send and receive on said data bus any length data packet; wherein each port J upon having a packet available for transmission executes the steps of:
(1) placing a signal S(J) on said control wire to communicate to ports J+1, J+2, ... ,N an intention to transmit a packet;
(2) delaying transmission for the time interval R(J)+T;
(3) ascertaining that no signal indicating an intention to transmit is being received at port J from any of ports 1,2, ... ,J−1, and that said common communication path at port J is unoccupied; and then
(4) transmitting the packet and terminating signal S(J).

8. Method for attaining asynchronous, bound wait, collision-free communication of data packets on a local shared bus network interconnecting a plurality of N ordered transceiving ports (1,2,3, ... ,J, ... N), the bus network including a data bus of latency T and a control wire having a propagation delay from port J to port N of R(J), each port J including means for ascertaining the presence of a data packet on said data bus at said port J, and further being adapted to send and receive on said data bus any length data packet; wherein each port J upon having a packet available for transmission executes the steps of:
(1) ascertaining that the data bus at said port J is unoccupied by a data packet throughout a period 2T;
(2) placing a signal S(J) on said control wire to communicate to ports J+1, J+2, ... ,N an intention to transmit a packet;
(3) delaying transmission for the time interval R(J)+T;
(4) ascertaining that no signal indicating an intention to transmit is being received at port J from any of ports 1,2, ... ,J−1, and that said common communication path at port J is unoccupied; and then
(5) transmitting the packet and terminating signal S(J).

9. Local shared bus network for attaining asynchronous collision-free communication of data packets, comprising:
data bus means having a signal latency T;
a plurality of N transceiving ports (1,2,3, ... ,J, ... N);
control path means having a propagation delay from port J to port N of R(J);
each port J comprising:
send flip flop means S(J) for selectively signalling to ports J+1, J+2, ... ,N, on said control path means an intention to transmit a data packet on said data bus means;
receive means, B(J), for detecting the absence of a data packet on said data bus means at said port J;
receive means, P(J), for detecting the absence at port J of a signal on said control path means from any of ports 1,2, ... ,J−1;
transmit control means for detecting the availability of a packet for transmitting by said port J on said data bus and providing availability signal a(J);
means responsive to availability signal a(J) for setting flip flop means S(J);
timing means for timing a period R(J)+T after the setting of flip flop means S(J);
means responsive to said timing means, said receive means, B(J) and said receive means, P(J), for transmitting said packet on said data bus means and for resetting said flip flop means S(J) when said bus has been observed idle at B(J) and said receive means P(J) detects the absence of a signal on said control path means at a time after R(J)+T.

10. Local shared bus network for attaining asynchronous, bounded wait, collision-free communication of data packets, comprising:
data bus means having a signal latency T;
a plurality of N transceiving ports (1,2,3, ... , J, ... N);
control path means having a propagation delay from port J to port N of R(J);
each port J comprising:
send flip flop means S(J) for selectively signalling to ports J+1, J+2, ... ,N, on said control path means an intention to transmit a data packet on said data bus means;
receive means, B(J), for detecting the absence of a data packet on said data bus means at said port J;
receive means, P(J), for detecting the absence at port J of a signal on said control path means from any of ports 1,2, ... ,J−1;
transmit control means for detecting the availability of a packet for transmitting by said port J on said data bus and providing availability signal a(J);
first timing means responsive to availability signal a(J) for ascertaining that said data bus means is unoccupied at port J by a data packet throughout a period 2T;
means responsive to said first timing means for setting flip flop means S(J);
second timing means for timing a period R(J)+T after the setting of flip flop means S(J);
means responsive to said timing means, said receive means, B(J), and said receive means, P(J), for transmitting said packet on said data bus means and for resetting said flip flop means S(J) when said bus has been observed idle at B(J) and said receive means P(J) detects the absence of a signal on said control path means at a time after R(J)+T.

11. Communication port control apparatus for controlling communication from a device over an asynchronous, shared bus network including a plurality of ports (1,2, ... ,J, ... ,N), the bus network including a data bus means having a data bus signal latency T and a control path means having a control signal latency from the Jth to the Nth port of R(J), the control apparatus for the Jth port comprising:

receive means, B(J), for ascertaining the absence of a data packet on said data bus means at said Jth port;

receive means, P(J), for ascertaining the absence of a control signal on said control path means at the input to said Jth port;

transmit control means for signalling the availability for transmission of a data packet;

send means responsive to said transmit control means for signalling on said control path means a transmit intention signal;

timing means for timing a period R(J)+T following the start of said transmit intention signal from said send means; and means responsive to said timing means, said receive means, B(J), and said receive means, P(J), for enabling transmission of a data packet on said data bus means;

whereby asynchronous, collision-free communication of data packets by said Jth port is enabled with respect to a shared bus network.

12. Communication port control apparatus for controlling communication from a device over an asynchronous bus network including a plurality of ports (1,2, ... ,J, ... ,N), the bus network including a data bus means having a data bus signal latency T and a control path means having a control signal latency from the Jth to the Nth port of R(J), the control apparatus for the Jth port comprising:

receive means, B(J), for ascertaining the absence of a data packet on said data bus means at said Jth port;

receive means, P(J), for ascertaining the absence of a control signal on said control path means at the input to said Jth port;

transmit control means for signalling the availability for transmission of a data packet;

first timing means responsive to said transmit control means and said receive means for timing a period 2T during which said data bus means is clear of data packets following availability of a data packet;

send means responsive to said first timing means for signalling on said control path means a transmit intention signal;

second timing means for timing a period R(J)+T following the start of said transmit intention signal from said send means; and means responsive to said timing means, said receive means, B(J), and said receive means, P(J), for enabling transmission of a data packet on said data bus means;

whereby asynchronous, collision-free communication of data packets by said Jth port is enabled with respect to a shared bus network with a bounded, guaranteed time to transmission of said data packet.

* * * * *